(12) United States Patent
Eckert

(10) Patent No.: US 7,404,779 B2
(45) Date of Patent: Jul. 29, 2008

(54) PLANETARY GEAR

(75) Inventor: Harald Eckert, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 312 days.

(21) Appl. No.: 10/576,482

(22) PCT Filed: Sep. 29, 2004

(86) PCT No.: PCT/EP2004/010885

§ 371 (c)(1),
(2), (4) Date: Apr. 21, 2006

(87) PCT Pub. No.: WO2005/030066

PCT Pub. Date: Jun. 2, 2005

(65) Prior Publication Data

US 2007/0032336 A1   Feb. 8, 2007

(30) Foreign Application Priority Data

Oct. 21, 2003  (DE) ................... 103 48 755
Oct. 21, 2003  (DE) ................... 103 48 757
Jan. 24, 2004  (DE) .............. 10 2004 003 684
Jan. 24, 2004  (DE) .............. 10 2004 003 685

(51) Int. Cl.
   *F16H 57/04*   (2006.01)
(52) U.S. Cl. .................. 475/159; 475/331
(58) Field of Classification Search ............. 475/159,
                                        475/160, 331
See application file for complete search history.

(56) References Cited

U.S. PATENT DOCUMENTS

| 2,066,952 | A | * | 1/1937 | Hilding | ............... 475/299 |
| 2,521,239 | A | | 9/1950 | McDowall et al. | |
| 2,751,266 | A | | 6/1956 | Palmgren et al. | |
| 2,791,130 | A | * | 5/1957 | Boughner | ............... 475/204 |
| 2,896,479 | A | | 7/1959 | Kelbel | |
| 3,296,895 | A | * | 1/1967 | Karlsson | ............... 475/139 |
| 3,426,623 | A | * | 2/1969 | Abbott | ............... 475/159 |
| 4,489,626 | A | | 12/1984 | Lemon | |
| 4,573,373 | A | | 3/1986 | Shimizu et al. | |
| 4,998,600 | A | | 3/1991 | Fuhrer et al. | |
| 6,605,019 | B1 | | 8/2003 | Eckert | |

FOREIGN PATENT DOCUMENTS

| DE | 540 974 | 12/1931 |
| DE | 847 549 | 8/1952 |

(Continued)

*Primary Examiner*—Ha D. Ho
(74) *Attorney, Agent, or Firm*—Davis Bujold & Daniels, P.L.L.C.

(57) ABSTRACT

A planetary transmission which has a drive shaft, an axial bearing, an internal gear, an axially displaceable sliding collar and a lubrication circuit and an output shaft which is mounted the transmission housing by an external bearing and an internal bearing. The housing is provided with an oil intake (13) which is connected to an oil line (16) with the external bearing (5) of the output shaft, which is linked by an oil feeding circuit with the axial bearing (9) of the output shaft. The axial bearing (9) is connected with an interior gear bearing by an interior gear (17), the interior gear (17) is encapsulated through a wall section (18). An oil discharge (14) is connected with an oil pump located outside the planetary transmission which, on the other hand, is connected with the oil intake (13).

9 Claims, 1 Drawing Sheet

FOREIGN PATENT DOCUMENTS

| | | |
|---|---|---|
| DE | 39 07 154 A1 | 9/1989 |
| DE | 41 31 164 A1 | 3/1993 |
| DE | 43 32 088 A1 | 3/1995 |
| DE | 198 53 459 A1 | 6/2000 |
| DE | 199 17 673 A1 | 10/2000 |
| DE | 101 61 374 A1 | 6/2003 |
| GB | 310522 | 4/1930 |

* cited by examiner

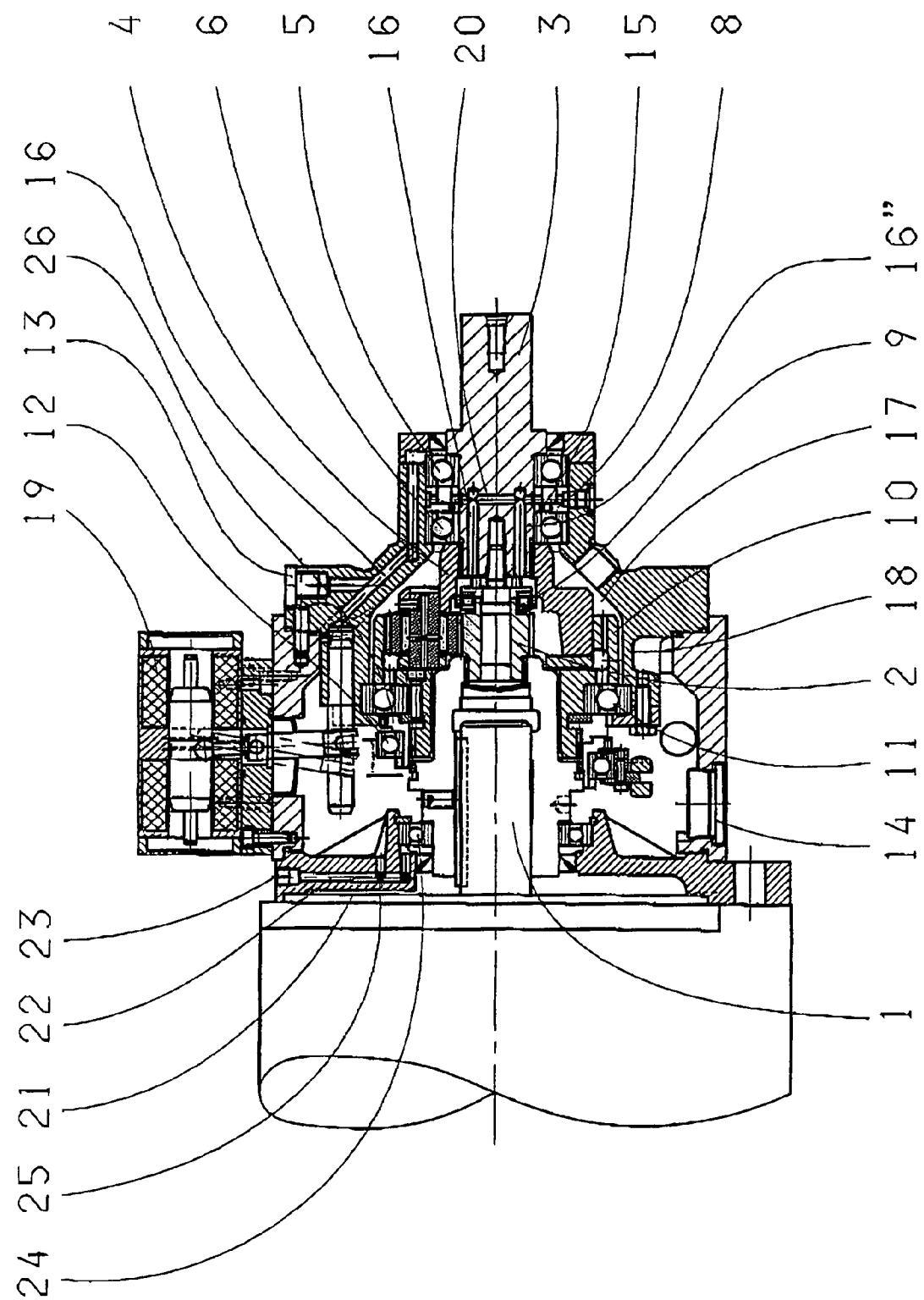

PLANETARY GEAR

This application is a national stage of PCT/EP2004/010885 filed Sep. 29, 2004 which claims priority from German Application Serial Nos. 103 48 757.3 filed Oct. 21, 2003, 103 48 755.7 filed Oct. 21, 2003, 10 2004 003 684.5 filed Jan. 24, 2004 and 10 2004 003 685.3 filed Jan. 24, 2004.

FIELD OF THE INVENTION

The present invention refers to a planetary transmission, in particular for machine tools.

BACKGROUND OF THE INVENTION

Such planetary transmissions, mostly built from single- or multiple- stage planetary transmissions, are basically implemented in machine tools, as well as in lathes, milling machines and machining centers. The selectable planetary transmission increases the service scope of the main spindle motors, as well as the flexibility of the machine tool for processing the different work materials through increasing high torques or high speeds. For example, two transmission stages may be built in, while on one hand, the drive shaft which is connected to a sun gear with an internal gear and on the other, the internal gear can be coupled to the housing. A planetary carrier is connected to the output shaft.

In DE A 199 17 673 of the applicant, there is such a two-stage planetary transmission, with a drive shaft and an output shaft which are mounted in the housing over roller bearings. The drive shaft is connected to a sun gear which engages with the planetary gears, which are mounted over bearings on planetary bolts in a planetary carrier, which is connected over a positive-fit connection with the output shaft. The planetary gears are combed with an internal gear, which is mounted over the roller bearings in the housing or in the rotating planetary carrier and positively fit with a hub connection. The hub is torque-proof connected over an external gearing with the first part of the sliding collar.

A roller bearing is located over the sliding collar. The external part is axially displaceable in the housing, running over bearing bolts, whereby the axial displacement of the external part is carried over the roller bearings.

The sliding collar displacement takes place by means of a switching device, which is actuated by a solenoid or by a motorized switching unit whose armature is connected with the sliding collar.

This kind of planetary transmission has multiple rotating elements and, consequently, many bearings which are lubricated with the appropriate oil. Most of the traditional planetary transmissions for machine tools use splash lubrication, which has the disadvantage that it may be tainted with high mix losses and that the maximum possible rotational speed of the internal gear is limited by the internal gear bearings as they get warm, as the absorbed heating cannot be released. It is possible to cool the splash lubrication oil with circulatory lubrication, without avoiding the mix losses.

Further planetary transmissions are built with circulatory lubrication and oil cooling. High mix losses are shown also in these cases, on which the target maximum rotational speed of the interior gear is only possible conditionally. Under very high rotational speeds, the oil from the central part will be shot by the centrifugal force towards the housing, leaving the center of the transmission with a low oil level during the operation, generating frictional corrosion.

Operation of a planetary transmission with oil spray lubrication has also been tried. This is however not applicable for planetary transmissions, as the oil spray cannot reach the center of the transmission because of the strong ventilation effect caused by the high rotational speed of the interior gear, which means that the sun gear is not lubricated. Therefore the axial bearings will be insufficiently lubricated and frictional corrosion may even be generated.

SUMMARY OF THE INVENTION

The purpose of the present invention is to create a planetary transmission with a lubrication circuit that is reliable under the high rotational speed of the interior gear and at the same time under low temperatures, so that no more frictional corrosion is generated.

The invention proceeds from a planetary transmission, in particular for machine tools, that has a drive shaft connected to a sun gear; an output shaft that is connected to a planetary carrier and that is mounted over the transmission housing with a first external bearing and with a second internal bearing, where both bearings are separated from each other by means of a piston ring; an axial bearing; an interior gear which is located over the interior gear bearing in the transmission housing; an axially displaceable sliding collar which is mounted over sliding collar bearings; and a transmission lubrication circuit with an oil pump.

According to the invention, it is planned that the oil pump be located outside the transmission, that the housing has an oil intake, that this oil intake is connected to an oil line with the first external bearing of the output shaft, that the bushings have a small borehole for connecting the piston ring, that the first external bearing is connected to an oil supply circuit with the axial bearing, that the axial bearing is connected over a cavity with the interior gear bearing, where the cavity is encapsulated through a wall section for the oil discharge hole in the transmission housing, and that the oil discharge is connected to the oil pump by an oil line.

With the invention based oil circuit application, it will be possible to handle higher rotational speeds of the interior gear based on lower temperatures, and no more frictional corrosion will be produced. It may be further possible to achieve a dry lubrication system, which means that no oil level will be necessary in the planetary transmission, by which also no mix losses and no temperature increase will occur, in comparison with the traditional planetary transmissions that show different oil levels that depend on the rotation direction and that have detrimental effects on the oil temperature.

The invention is explained in further detail in the only FIGURE, in which a section of a two-stage planetary transmission is shown, in particular for a machine tool, on which the proposed lubrication circuit can be seen.

BRIEF DESCRIPTION OF THE DRAWINGS

Two-stage planetary transmissions for machine tools are well known by specialists, therefore only the description required for understanding the parts of the proposed invention follows.

DETAILED DESCRIPTION OF THE INVENTION

The drive shaft of the transmission is identified with number 1. The sun gear to which it is connected is identified with number 2, while the output shaft is identified with number 3 and the planetary carrier to which they are connected with number 4. The oil intake is identified with number 13, the application example close to the switchgear is identified with number 19, which is intended for the sliding collar 11 in the bearings or in the transmission housing. This oil intake is connected with an oil pump (that is not shown) outside of the transmission, and with an oil line 16, which is built into the wall of the transmission housing with the first external bearing 5 of the drive shaft 3. The first external bearing 5 is sealed off from the second internal bearing 6 by a piston ring 8, whereby this piston ring 8 is provided with an opening. This opening can either be the small borehole 15 of the piston ring that penetrates the internal or external bushing parallel to the drive shaft axle, or a narrow gap between piston ring 8 and the external bushing, so that a small oil quantity is applied to the second internal bearing 6.

The first external bearing 5 is connected with the axial bearing 9 over two parallel oil lines 16', 16" in the longitudinal axle of the output shaft, which in order to prevent unbalancing are placed over the longitudinal axle symmetrical levels of the output shaft. Either a single oil line or more than two oil lines can be applied.

Both of these oil lines 16' and 16" remain perpendicular to the output shaft over the longitudinal axle penetrating borehole 20 connection. Oil from the first external bearing 6 to the axial bearing 9 flows through this oil circuit.

The oil flows to the output shaft center, where it arrives after flooding axial bearing 9 due to the rotational force in the direction of the housing inner wall. A cavity 17 runs through the closed bearing housing wall section 18, through which oil will flow to interior gear bearing 11, which will then be optimally lubricated and cooled, allowing the rotational speed to be increased. In the traditional planetary transmissions, the maximum rotational speed of the transmission is limited by the top rotational speed of the interior gear.

The closed bearing housing on wall section 18 is encapsulated due to the rapidly turning interior gear 11, whereby the interior gear oil adulteration is prevented or at least significantly reduced, and a rotation direction depending oil level is also avoided.

The interior gear bearing 11 is not connected with the sliding collar bearing 12 of the sliding collar 26, as this sliding collar bearing, which due to its small overall size is not critical for the rotational speed and in addition must not absorb any axial and/or radial forces, it can be lubricated with an oil spray.

Provided that the planetary transmission has an adapter plate 21 between the drive shaft and the transmission, it will then have its own oil intake 23, on which an oil line 22 is attached for lubricating the associated bearing 24. This oil line 22 is provided with a discharge borehole 25, so that in case a high oil quantity circulates through it, there is also high oil pressure in line 22.

In one (not shown) application example, instead of the oil intake 13 close to switchgear 19 there is a centered axial borehole in drive shaft 3, so that oil can flow through this centered borehole to oil lines 16', 16" and 20. The oil intake 13 may also serve for feeding.

It should be stressed that it is also possible to deploy an oil circuit in the opposite direction, which means that the above-described oil discharge 14 can be the oil intake, and the above described oil intake 13 can become the oil discharge.

The continuous flow over the planetary transmission provides excellent lubrication, at the same time excellent oil cooling, and prevents the formation of frictional corrosion.

The dry lubrication system according to the invention eliminates the need for an oil level together with adulteration and the until now unavoidable temperature increase. The selective lubrication of the individual machine components leads at the same time to a significant rotational speed increase of the internal gear by reducing the frictional corrosion. The encapsulation through wall section 18 contributes significantly to these benefits.

Reference Signs
1 Drive shaft
2 Sun gear
3 Output shaft
4 Planetary carrier
5 External gear
6 Interior gear
7 Housing
8 Piston ring
9 Axial bearing
10 Interior gear
11 Interior gear bearing
12 Sliding collar bearing
13 Oil intake
13' Oil intake
14 Oil discharge
15 Borehole
16 Oil line
16' Oil line
16" Oil line
17 Cavity
18 Wall section
19 Switchgear
20 Oil line
21 Adapter plate
22 Oil line
23 Oil intake
24 Bearing
25 Discharge borehole
26 Sliding collar

The invention claimed is:

1. A planetary transmission for machine tools, the planetary transmission comprising:
a drive shaft that is connected to a sun gear;
an output shaft connected to a planetary carrier and mounted over a transmission housing by an external bearing and an internal bearing, both of the external bearing and the internal bearing being separated from one another by a piston ring;
an axial bearing;
an interior gear which rotates over an interior gear bearing and is located in the transmission housing,
an axially displaceable sliding collar; and
a lubrication circuit in the transmission;
the housing being provided with an oil intake (13) that is connected to an oil pump located outside the transmission, the oil intake (13) supplies an oil flow over an oil line (16) to the external bearing (5) of the output shaft (3), the piston ring (8) is located between the external bearing (5) and the internal bearing (6), the oil intake (13) serves as an oil passage, in which the external bearing (5) is connected through an oil feeding circuit with the axial bearing (9), and the axial bearing (9) is connected with a cavity (17) in the interior gear bearing (11), the cavity (17) is encapsulated through a wall section (18) of the transmission housing to an existing oil discharge (14).

2. The planetary transmission according to claim 1, wherein the oil feeding circuit, between the external bearing (5) and the axial bearing (9), comprises of at least one line (16', 16") that run parallel in a symmetric level through a longitudinal axis of the output shaft (3).

3. The planetary transmission according to claim 1, wherein the oil intake (13) is provided in at least one of the internal bearing, the external bearing and the axial bearing and in the transmission housing.

4. The planetary transmission according to claim 1, wherein the oil intake is located in a centered borehole in the output shaft (3).

5. The planetary transmission according to claim 1, wherein a discharge of the piston ring (8), implemented in the piston ring (8), crosses parallel to a longitudinal axis of the output shaft (3), without any borehole (15) in either one of an external bushing or an internal bushing.

6. The planetary transmission according to claim 1, wherein a piston ring (8) discharge is a narrow gap between the piston ring (8) and an external bushing.

7. The planetary transmission according to claim 1, wherein when an adapter plate (21) is placed between the drive shaft and the planetary transmission, the plate (21) is provided with an oil intake (23) and with an oil line (22) so that the plate (21) is connected to a discharge borehole (25) with the transmission.

8. The planetary transmission according to claim 1, wherein the oil intake becomes the oil discharge and the oil discharge becomes the oil intake.

9. The planetary transmission according to claim 1, wherein the oil feeding circuit, between the external bearing (5) and the axial bearing (9), comprises of a plurality of lines (16', 16") that run parallel in a symmetric level through a longitudinal axis of the output shaft (3), the plurality of lines (16', 16") are connected perpendicularly to each other over the longitudinal axle of the output shaft (3) and to a penetrating oil line (20).

\* \* \* \* \*